Nov. 30, 1965    A. ERBERT    3,220,681
BASE MAT
Filed May 5, 1964
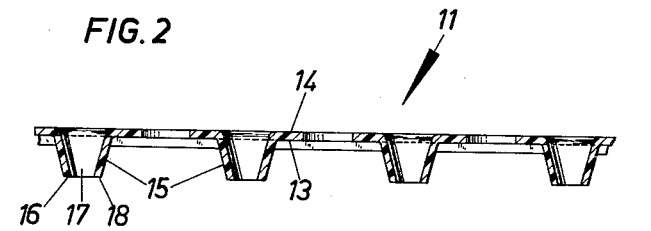
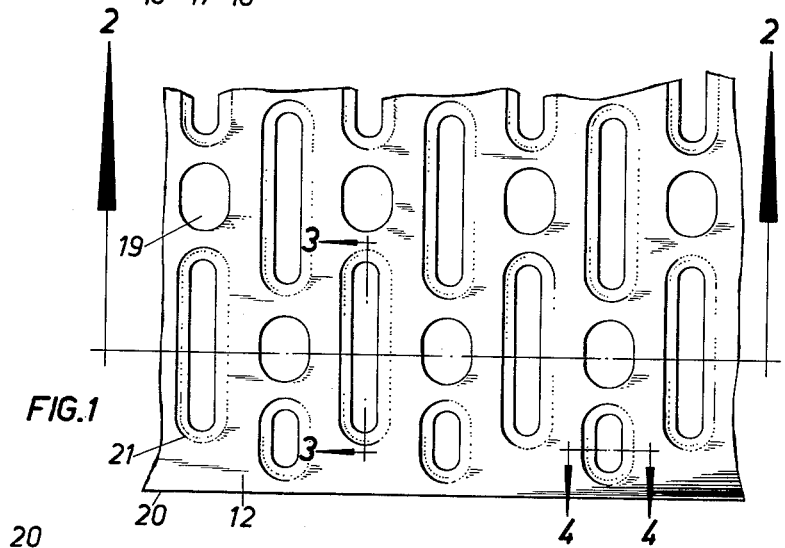
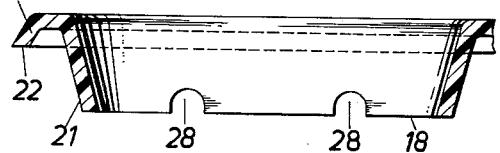
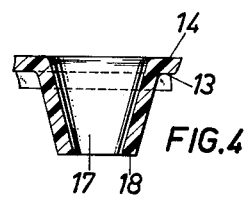
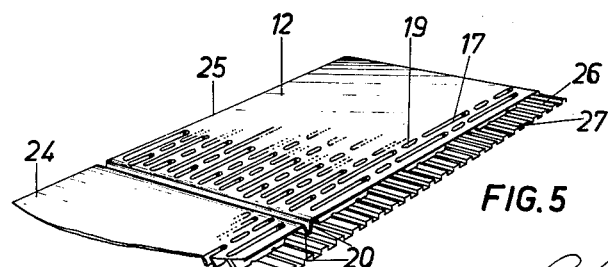
INVENTOR
Adelhard Erbert

# United States Patent Office 3,220,681
Patented Nov. 30, 1965

3,220,681
BASE MAT
Adelhard Erbert, 3835 Trinity St., North Burnaby,
British Columbia, Canada
Filed May 5, 1964, Ser. No. 365,086
1 Claim. (Cl. 248—119)

This invention relates to improvements in conventional base or separation mats or racks for use with perishable goods requiring refrigeration or temperature maintenance while being transported by such means of transportation as trucks, trailers, railroad cars and sea going vessels, among others, wherein such mats or racks are used in order to provide constant and continuous air circulation, and to separate various layers of perishable goods according to commodity requirements.

Since it is common practice to use mats or racks made of wood in open frame construction to fulfill this need for separation of refrigerated or heated perishable goods, such material usage and construction has the disadvantage of becoming soaked and impregnated wtih blood and other types of foreign deposits draining from the goods (for example meat) thus allowing decay forming bacteria to become lodged in the mats or racks. Attempts to clean such wooden mats or racks are never completely successful since the material used becomes impregnated with the blood or other seepage and upon exposure to other than the controlled temperature, the bacteria embodied therein are given the opportunity of multiplying and spreading throughout the mat or rack thus rendering it unfit for further use in a very short time.

Since the base or separating mat or rack as proposed by the present invention can be cleaned easily and will not become impregnated with blood or other seepage from the goods being carried such a mat or rack is superior with respect to health and sanitation, particularly in the common carriage of food stuffs.

One material contemplated, among many, in the construction of the present invention is impervious plastic comprising an overall mat or rack member formed in one piece and provided with a number of downward projections on the underside having holes throughout to allow air circulation as required. Such reinforced plastic or fibreglass construction will result in the mat or rack having a much stronger and superior quality to existing wooden mats or racks. Although the initial cost may be slightly higher than the presently used wooden mat or rack such superior strength and impervious material will result in longer usage and lower cost for upkeep, providing a much lower cost factor during life of the mat or rack.

The present conventional wooden mat or rack is both heavy and bulky which results in loss of space and revenue producing weight. The present invention would weigh much less than existing mats or racks made of wood and take up less space in use and while stored in the carrier, thus realizing greater revenue to the carrier by its use.

Because of the construction of the present invention the usual corners and crevices found in conventional wooden mats or racks can be eliminated and rounded surfaces employed, thus eliminating joints and crevices in which dirt and bacteria producing seepage can accumulate and multiply.

Other objects and features of the invention will be apparent from the following detailed description and accompanying drawings in which like numerals refer to like parts throughout the various views.

In addition to other advantages listed of the present invention, a further advantage occurs in the potential safety factor since the currently used conventional wooden mats or racks contain wide interior spacing whereby that workman's heels and shoes readily become caught or slide into the space between wooden slats thereby resulting in potential injury to workmen and loss of man hours. The present invention contemplates narrowing of air circulation apertures and resulting elimination of such hazards.

In the drawings:
FIG. 1 is a plan view of a portion of a base mat according to the present invention.
FIG. 2 is a section along the line 2—2 of FIG. 1.
FIG. 3 is a fragmentary section taken along line 3—3 of FIG. 1.
FIG. 4 is a fragmentary section taken along the line 4—4 of FIG. 1.
FIG. 5 is a perspective view of a base mat according to the present invention, located in position on a conventional duckboard floor of a refrigerated truck.

Referring to FIGS. 1, 2, 3 and 4, a base mat indicated generally as 11 is illustrated and comprises a mat member 12, formed in one piece, having a bottom side 13 and a top side 14. A plurality of elongate truncated supporting feet 15 are formed in mat member 12 and project downwardly, the lower surface 16 of feet 15 being perforated to provide supporting edges 18, adapted to support mat 12 above a floor.

A plurality of openings or holes indicated at 19 are provided in mat member 12; interspaced between the feet 15, holes 19 and holes 17 permitting refrigerated or heated air to circulate from beneath mat member 12 to materials located on mat 12 that require to be maintained in refrigerated or heated condition.

Feet 15 are truncated in order to provide stacking facilities for location of mats on top of each other during storage periods, this truncation permitting the feet from the overlying mat to protrude into the holes 17 of the underlying mat to an extent where a comparatively small space is located between surface 14 of the underlying mat and surface 13 of the overlying mat, such small space being required to permit and facilitate drying out of moisture during such stacking period after the mat having been washed to remove foreign bodies and contaminating materials such as blood, etc.

It is important that drying out of such cleansing moisture is facilitated since moisture, located on mats, upon such mats being located in a refrigerated truck, will cause condensation of this moisture on the surfaces of the mat during the rapid cooling operation that these mats will be subjected to, thereby providing survival means for bacteria, etc., who cannot survive without moisture and providing correcting means for dust and dirt.

In order to ensure rigidity in all directions of base mat 12, feet 15 may be elongated sufficiently to overlap each other in any cross sectional direction, thereby eliminating the danger of having a cross section that in its entirety only has the thickness of the mat material along which a possible bend could occur and cause inadvertent damage to the mat.

A downwardly depending lip 20 is located at two sides, directly adjacent narrow ends 21 of feet 15 and thereby provide extra sturdiness at these ends to prevent bending of mat 12 along a line parallel to long axis of feet 15.

Lip 20 depends downward only a portion of the height of feet 50 thereby to ensure that edge 22 of lip 20 at all times is located above surface 16. Lip 20 depends downward and outward from surface 14 at sufficient angle to permit stacking as above mentioned.

Holes 19 will be of smaller elongate dimension than feet 15 in order to provide above overlapping feature for sufficient reinforcement of base mat 12, it being noticed that no straight line may be drawn across base mat 12 in any direction without encountering at least two downwardly projecting reinforcement profile either derived from feet 15 or lips 20.

It will be understood that various types of regular patterns arranged over the area of the mat may be resorted to and the type of pattern as shown is done so by way of example only. Thus the pattern of the according feet and interspaced holes could be arranged obliquely to the sides of the mat or combinations of various patterns may be used on the one mat.

Referring to FIG. 5, two adjacently located base mats 24 and 25 are illustrated located on a conventional duckboard floor 26 of a conventional refrigerator truck or the like, corrugation 27 in duckboard floor 26 permitting refrigerated or heated air to travel along the floor within corrugation 27 to progress freely through holes 17 and 19 to goods located over base mat 12.

Lips 20 of base mats 24 and 25 are located adjacent each other and also serve to prevent one mat from sliding up over the other during use.

It will be understood that feet 15 and holes 19 may be located close together or spaced considerably apart according to the type of goods that are to be transported on base mat 12 and specific requirements governed by each particular case.

The width of hole 19 and holes 17 may be made narrower than the heel portion of a conventional shoe to prevent accidents due to a shoe heel catching in such holes as a labourer walks over mats 12 to locate goods theeron.

Referring to FIG. 3, extra cutouts 28 may be located in lower edge 18 of feet 15 to provide increased circulation area to permit air to circulate more freely into holes 17 of feet 15 upon this being required for the particular goods carried.

From the foregoing it will be seen that the present invention provides an improved base mat for use with refrigerated or heated trailers, railroad cars, or the like, particularly for transport of meat, packed goods, etc., the base mats embodying the present invention being of exceptionally light weight, yet providing rigidity in all directions together with highly sanitary features, thereby resulting in a superior base mat.

In addition, by constructing a base mat according to the present invention, a considerable saving in overall upkeep costs may be added to the saving due to a lighter weight and smaller storage space requirement than that necessary for conventional base mats, the space saving feature particularly being due to the fact that the mat may be made to be nested, one within the other, upon the mats being stocked in a portion of the trailer for instance during return journey from a delivery.

This advantage is particularly important during return runs where mats are not required for goods that may be transported during such return runs, thereby providing extra space for such further goods.

In addition a more sanitary base mat results by utilizing the present invention thereby providing an aid to the general public health, when compared with the old style of wooden base mats that are quite unsanitary, it being almost impossible to remove blood and bacteria that has seeped into the wood during prior transport.

Nails, etc., utilized in conventional wooden base mats are entirely eliminated in the present invention, thereby preventing the hazard of such nails working loose and protruding above the upper surface of the base mat to provide danger of stumbling for the workmen carrying goods into a refrigeraor truck as well as danger of damage through ripping cartons or cases as these are located over protruding nails in conventional wooden base mats.

A considerable number of shipments are presently being damaged by protruding of nails in conventional wooden base mats, when in use by vibration or friction. Cardboard packed commodities are in many cases rejected by customers under these conditions.

Although the cost of producing individual mats under the present invention may be slightly more than the cost of producing conventional wooden mats, the exceptional life duration of mats produced under the present invention, in comparison with the life span of conventional mats will provide a very considerable saving to the users thereof.

It will be further understood that although specific embodiments of the invention have herein been described and illustrated, the invention also contemplates such variations as may fall within the scope of the appended claims.

The embodiments of this invention in which an exclusive property or privilege is claimed are defined as follows:

A base mat for use with temperature controlled chamber, said mat being constructed of reinforced plastic material and formed in one piece, said mat comprising: a generally flat rectangular mat member; a plurality of hollow supporting feet protruding from a bottom side of said mat member, said feet being defined by a generally frustoconical wall having an internal bore therethrough, said feet being arranged in a regular pattern over the area of said mat member; portions of said mat member having holes interspaced between said feet, other portions of said mat member having holes directly above said internal bores of said feet, thereby permitting air circulation from one side to the other of said mat member, said hollow supporting feet being located in rows alternating with said holes in said portions, adjacent rows having said supporting feet of one row located directly opposite said holes of said adjacent row, said feet being elongate in a direction parallel to said rows, each longitudinal end of each one of said feet extending past an adjacent foot in said adjacent row, and a downwardly and outwardly projecting lip formed along at least one edge of said mat, the lower end of said walls defining said feet including at least one vertically extending recess, said feet being truncated, said truncated feet having said smaller diameter located at a lower end at said bottom side of said mat.

References Cited by the Examiner

UNITED STATES PATENTS

| | | | |
|---|---|---|---|
| 2,776,772 | 1/1957 | Itoda | 217—65.5 |
| 2,922,541 | 1/1960 | Martelli et al. | 217—27 |
| 3,008,702 | 11/1961 | Breneman | 217—35 X |
| 3,056,494 | 10/1962 | Reifers et al. | 206—65 |

FOREIGN PATENTS 542,788  1/1942  Great Britain.

CLAUDE A. LE ROY, *Primary Examiner.*

JOHN PETO, *Examiner.*